M. PERUZZI.
NUT SALTING MACHINE.
APPLICATION FILED JAN. 31, 1921.

1,423,014.

Patented July 18, 1922.
2 SHEETS—SHEET 1.

INVENTOR,
Mario Peruzzi.
BY
Mason Fenwick & Lawrence
ATTORNEYS.

M. PERUZZI.
NUT SALTING MACHINE.
APPLICATION FILED JAN. 31, 1921.
1,423,014.
Patented July 18, 1922.
2 SHEETS—SHEET 2.
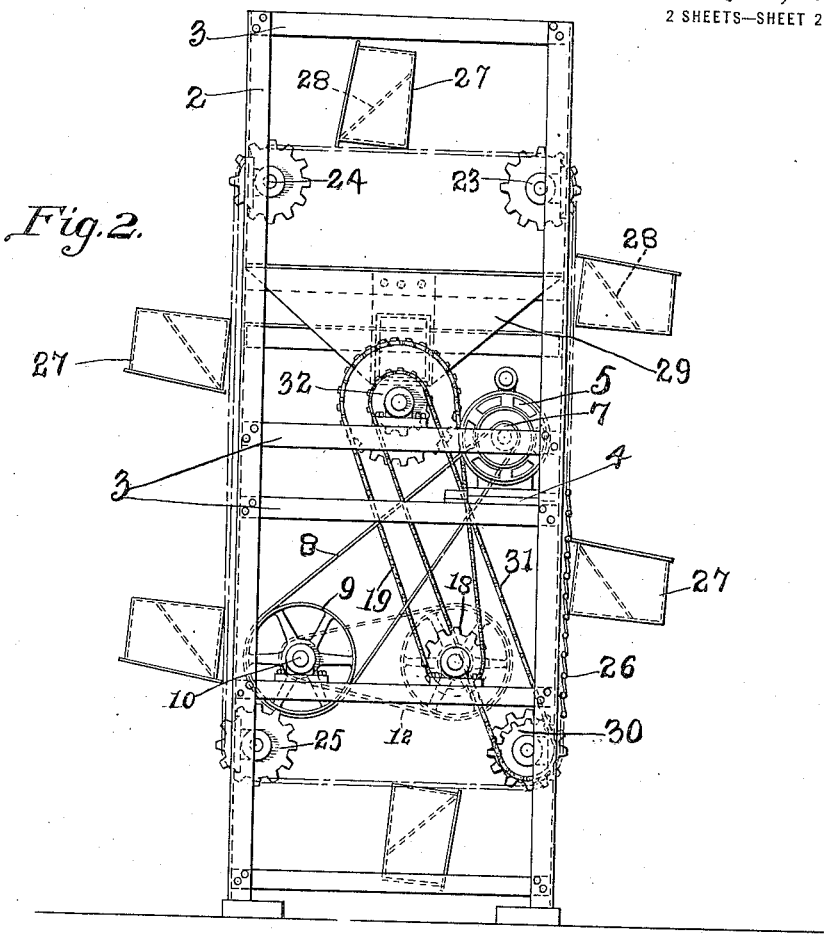
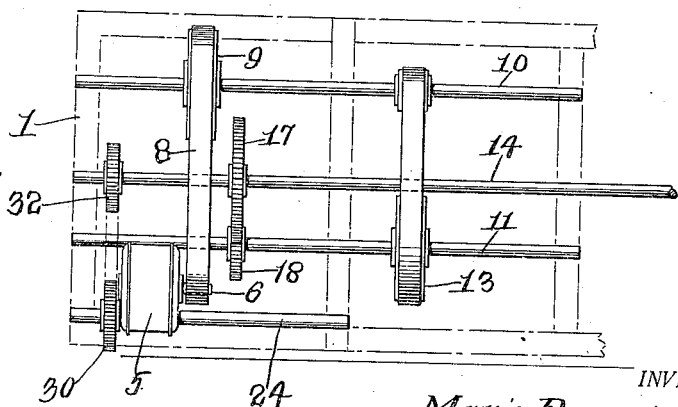
INVENTOR,
Mario Peruzzi.
BY
Mason Fenwick & Lawrence
ATTORNEYS.

UNITED STATES PATENT OFFICE.

MARIO PERUZZI, OF WILKES-BARRE, PENNSYLVANIA.

NUT-SALTING MACHINE.

1,423,014.	Specification of Letters Patent.	Patented July 18, 1922.

Application filed January 31, 1921. Serial No. 441,378.

*To all whom it may concern:*

Be it known that I, MARIO PERUZZI, a citizen of the United States, residing at Wilkes-Barre, in the county of Luzerne and State of Pennsylvania, have invented certain new and useful Improvements in Nut-Salting Machines; and I do hereby declare the following to be a full, clear, and exact description of the invention, such as will enable others skilled in the art to which it appertains to make and use the same.

This invention relates to new and useful improvements in salting machines and more particularly to a motor operated machine adapted for salting blanched nuts. The main object of the present invention is the provision of a machine whereby blanched peanuts, almonds and in fact any type of nut which is sold in a salted condition will be provided with a sufficient coating of salt to provide the necessary tasteful condition of the nut when placed upon the market.

Another object of the present invention is the provision of a salting machine provided with a suitable conveyer for conveying the blanched nuts to a hopper having a conveyer connected therewith to convey the nuts into a rotary drum where a coating of oil is applied to the nuts prior to their delivery into a second drum where a coating of salt will adhere to the oil coated nuts so that when the nuts are delivered from the second drum, a sufficient quantity of salt will have adhered to the surface of the nuts to provide for the proper tasteful condition of the nuts when sold.

With the above and other objects in view the invention consists in the novel features of construction, combination and arrangement of parts hereinafter more fully set forth, pointed out in the claims and shown in the accompanying drawings in which:

Figure 2 is an end elevation, and

Figure 3 is a detail plan view illustrating the relative positions of the operating shafts and the manner of connecting them.

Figure 1:
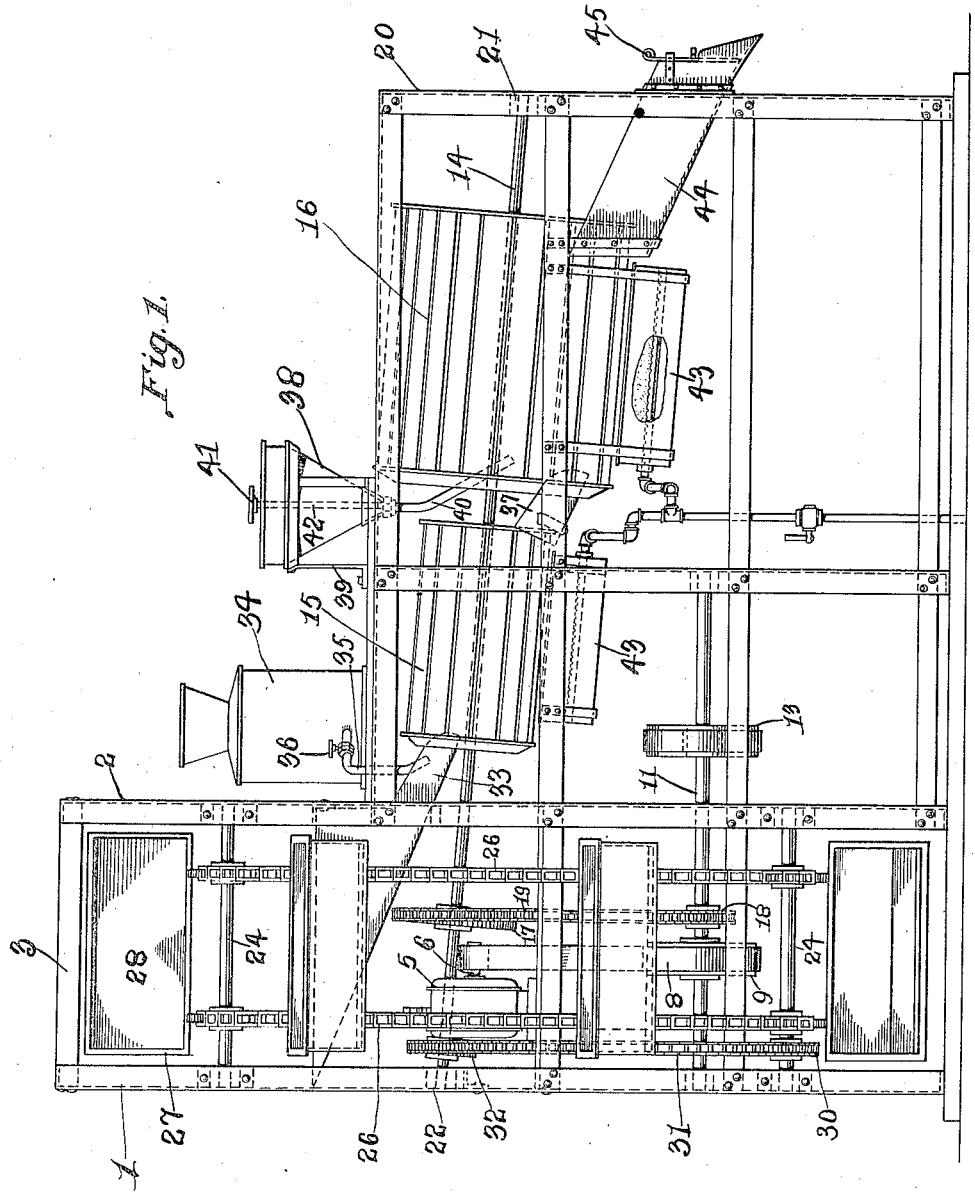
Figure 1 is a side elevation of a salting machine constructed in accordance with my invention.

In the construction of my improved salting machine I provide an upright frame portion generally indicated by the numeral 1 comprising a plurality of uprights comprising the corner members 2 suitably connected by the transverse members 3 whereby to provide a substantial frame work for the operating mechanism of the machine. Arranged within this upright portion 1 and supported by certain of the transverse members 3 is a platform 4 upon which is mounted a motor 5, said motor in the present instance being illustrated as an electric motor, but it will be understood that any other suitable motor power may be used for driving the operating parts.

The motor 5 is provided with a stub shaft 6 having a pulley 7 thereon which is connected by means of a belt 8 to a pulley 9 mounted upon the shaft 10. The shaft 10 will be known as the driving shaft and is connected to a shaft 11 by means of a belt 12 which extends over a small pulley on the shaft 10 and the large pulley 13 on the shaft 11.

In order to impart movement to the inclined shaft 14 which supports the oil drum 15 and the salting drum 16, a gear 17 is mounted upon the shaft 14 within the upright frame portion 1 and connected to a gear 18 by means of a sprocket chain 19. It will be noted that adjacent the upright frame 1, a substantially rectangular frame portion 20 is provided and comprises a plurality of uprights suitably connected by horizontal members to form a susbtantially rigid supporting frame for the operating mechanism arranged therein and the shaft 14 is provided with a bearing 21 arranged in one end of the frame portion 20 and a second bearing 22 arranged in the frame portion 1.

Suitably supported within bearings 23 are the shafts 24, said shafts being arranged in pairs at a point adjacent the top and the bottom of the frame portion 1 and disposed upon opposite sides of the frame as illustrated in Figure 2. These shafts 24 support the sprocket wheels 25 over which the chains 26 run, said chains having connected thereto a plurality of conveyer receptacles 27, the relative positions of these receptacles 27 being clearly illustrated in Figure 2, and I wish to call attention to the inclined portion 28 arranged within these receptacles so that as each receptacle reaches the top of the frame portion 1, and is positioned upon its side the contents of the receptacle will be readily removed by gravity into a hopper 29 mounted within the frame portion 1 and in such a position as to readily receive the contents of each of the receptacles 27 when they reach the top portion of the frame and are moved upon their sides as shown in Figure 2 of the drawings.

In order to impart movement of the shafts 24, a sprocket 30 is mounted upon one of the lowermost shafts and is connected by means of a sprocket chain 31 to a sprocket 32 upon the shaft 14. It will be noted that the hopper 29 is provided with a conveyer chute 33 extending into the upper end of the drum 15 so that when the blanched nuts are deposited within the hopper 29, they will readily pass down through the trough 33 into the drum 15.

Mounted upon the frame portion 20 at a point above the upper end of the drum 15 is an oil receptacle 34 which is adapted to contain a sufficient quantity of oil and is provided with a conveyer pipe 35 extending downwardly into the lower end of the trough 33, the contents of the receptacle 34 flowing out through the pipe 35 and the control of the flow being regulated by means of a valve 36 so that the proper quantity of oil can be dispensed from the receptacle 34 in accordance with the amount of nuts being deposited within the hopper 29. The particular purpose of the oil is for coating each one of the nuts so that when they are deposited within the drum 16, which contains the salt, a sufficient quantity of the salt will adhere to each one of the nuts to provide for the proper tasteful condition of the nuts. It will be noted that a suitable conveyer chute 37 is connected to the lower end of the drum 15 and extends into the upper end of the drum 16 so that after the nuts have been well coated with the oil, they will be conveyed into the salting drum 16.

Arranged above the upper end of the drum 16 is a salt receptacle 38 supported on the frame 20 by suitable brackets 39. The receptacle 38 is provided at its lower end with an outlet pipe 40 whereby the contents thereof will flow into the drum 16, the flow being regulated by means of a valve member arranged within the lower end of the receptacle 38 and controlled by means of a hand wheel 41 connected to the upper end of the valve stem 42. From this it will be apparent that the proper quantity of salt can be deposited within the drum 16 in accordance with the number of nuts passing through the drums.

In order to keep the oil in its proper condition to prevent the same from congealing after leaving the receptacle 34, steam drums 43 are arranged beneath the drums 15 and 16 to retain the contents of the drums in a slightly heated condition so that all of the nuts will be well coated with the oil whereby a sufficient quantity of salt will readily adhere to the exterior surface of the nuts before being drawn off from the drum 16.

Supported at one end of the frame portion 20 is a hopper 44 adapted to receive the salted nuts from the drum 16 and is provided with a movable stop plate 45 to regulate the discharge of nuts from the drum 16. From this it will be noted that after the nuts have passed through the drums 15 and 16 they may be readily withdrawn into suitable containers by regulation of the movable stop plate 45.

From the above description taken in connection with the accompanying drawings, it will be readily apparent that I have provided a simple and durable machine for coating blanched nuts with a sufficient quantity of salt to provide for the proper tasteful condition of the nuts, and in the operation of my machine, the blanched nuts are placed in the conveyer receptacles 27 at the bottom of the frame portion 1 and conveyed upwardly until the receptacle 27 reaches the top of the frame portion where in passing from one side to the other of the frame, the receptacle is arranged upon its side so that the contents of the same will by gravity readily flow therefrom into the hopper 29 and be conveyed through the chute 33 into the drum 15. As the nuts pass through the chute 33 into the drum 15, they will carry a proper quantity of oil with them which is being deposited at all times through the conveyer pipe 35 from the receptacle 34 and by rotating the nuts within the drum 15, all of the nuts will receive a proper coating of the oil before being conveyed into the drum 16. The nuts, after reaching the drum 16, are rotated around this drum so that each nut will have a suitable quantity of salt adhered to its exterior surface before being withdrawn through the chute 44. It will be noted that the conveyer and drums 15 and 16 operate simultaneously through the general arrangement of the shafts and the connections between the same so that a continual supply of nuts can be conveyed to the hopper 29 for passage through the drums 15 and 16.

I claim:

1. A salting machine for blanched nuts including a supporting frame, a receiving hopper in one end of the frame, an inclined shaft extending through the frame, aligned drums mounted upon the shaft, a chute extending from the hopper into one end of one of the drums, means for conveying the blanched nuts to the hopper, means for operating the conveying means and rotating the drums simultaneously, means for supplying a quantity of coating material to one of the drums and additional means for supplying a quantity of salt to the other of said drums.

2. A salting machine for blanched nuts including a supporting frame, an inclined shaft arranged within said frame, drums mounted upon said shaft for rotation with the shaft, means for imparting movement to the shaft, means for simultaneously feeding the nuts to the drums upon rotation of the same, means for supplying a coating material to one of the drums, means for supplying a quantity of salt to the other of said drums and means for heating said drums to retain the coating material in its proper condition.

3. A salting machine for blanched nuts including a supporting frame, an inclined shaft within the frame, drums mounted thereon for rotation with the shaft, means for imparting movement to the drums, means for simultaneously feeding the nuts to the drum during the rotation of the same, a communicating chute between said drums and an additional chute extending from one of the drums outwardly beyond the frame portion whereby to feed the salted nuts into a container, means for supplying a coating material to one of the drums, means for supplying a quantity of salt to the other of said drums and means for heating said drums to retain the coating material in its proper condition.

4. A machine of the class described including a supporting frame, a pair of drums mounted for rotation within the frame, means for supplying a quantity of blanched nuts to the drums, means for supplying a coating material to one of the drums, additional means for supplying granular or powdered material to the other of said drums and means for conveying the nuts from one drum to the other.

5. A machine for salting blanched nuts including rotatably inclined drums, means for supplying the nuts to the drums, means for supplying a coating material to one of the drums, means for supplying a granular or powdered material to the other of said drums and means for conveying the nuts from one drum to the other.

6. A machine for salting blanched nuts including rotatably inclined drums, means for supplying the nuts to the drums, means for supplying a coating material to one of the drums, means for supplying a granular or powdered material to the other of said drums, means for conveying the nuts from one drum to the other and means for heating said drums to retain the coating material in an adhesive condition.

7. A machine of the class described comprising inclined communicating drums mounted for rotation, means for conveying the material to be coated into said drums, means for supplying a coating material to one of said drums and means for supplying a granular material to the other of said drums.

In testimony whereof I affix my signature.

MARIO PERUZZI.